United States Patent
Schlintz et al.

(10) Patent No.: US 9,067,665 B1
(45) Date of Patent: Jun. 30, 2015

(54) STEERING FUSE

(71) Applicant: Caterpillar Inc., Peoria, IL (US)

(72) Inventors: John Schlintz, Milwaukee, WI (US); Bryan L Danner, Oshkosh, WI (US)

(73) Assignee: Caterpillar Inc., Peoria, IL (US)

( * ) Notice: Subject to any disclaimer, the term of this patent is extended or adjusted under 35 U.S.C. 154(b) by 13 days.

(21) Appl. No.: 14/109,040

(22) Filed: Dec. 17, 2013

(51) Int. Cl.
*B63H 25/52* (2006.01)
*B63H 25/10* (2006.01)
*F16D 9/06* (2006.01)

(52) U.S. Cl.
CPC ........ *B63H 25/52* (2013.01); *F16D 9/06* (2013.01); *B63H 25/10* (2013.01)

(58) Field of Classification Search
CPC ........ B63H 23/00; B63H 23/06; B63H 25/10; B63H 25/52; B65G 43/02; F16D 43/20
USPC ............................ 114/144 R; 440/75, 84, 86
See application file for complete search history.

(56) References Cited

U.S. PATENT DOCUMENTS

| | | |
|---|---|---|
| 3,146,755 A | 9/1964 | Morse |
| 3,238,914 A | 3/1966 | Swallow |
| 4,521,201 A | 6/1985 | Watanabe |
| 4,701,141 A | 10/1987 | Sumigawa |
| 4,840,136 A | 6/1989 | Brandt |
| 4,842,559 A | 6/1989 | Litjens et al. |
| 5,649,844 A * | 7/1997 | Caricof et al. .................. 440/75 |

FOREIGN PATENT DOCUMENTS

GB     857394     12/1960

* cited by examiner

*Primary Examiner* — Lars A Olson
(74) *Attorney, Agent, or Firm* — Andrew A. Phillips

(57) ABSTRACT

A steering system for a marine pod drive is disclosed. The system includes a driving pinion attached to a driving shaft. The system further includes a driven gear mounted to a driven shaft. Moreover, the system includes an intermediate gear mounted to an intermediate shaft and in mesh with the driving pinion. Furthermore, an intermediate pinion is attached to the intermediate shaft. The intermediate pinion is in mesh with the driven gear on the driven shaft. Moreover, the intermediate pinion may be fastened with the intermediate gear by a shear pin such that the intermediate pinion rotates with the intermediate gear. The shear pin may be configured to shear when a torque transmitted through the system exceeds a rated torque value, thereby causing the intermediate gear to rotate freely on the intermediate shaft.

1 Claim, 1 Drawing Sheet

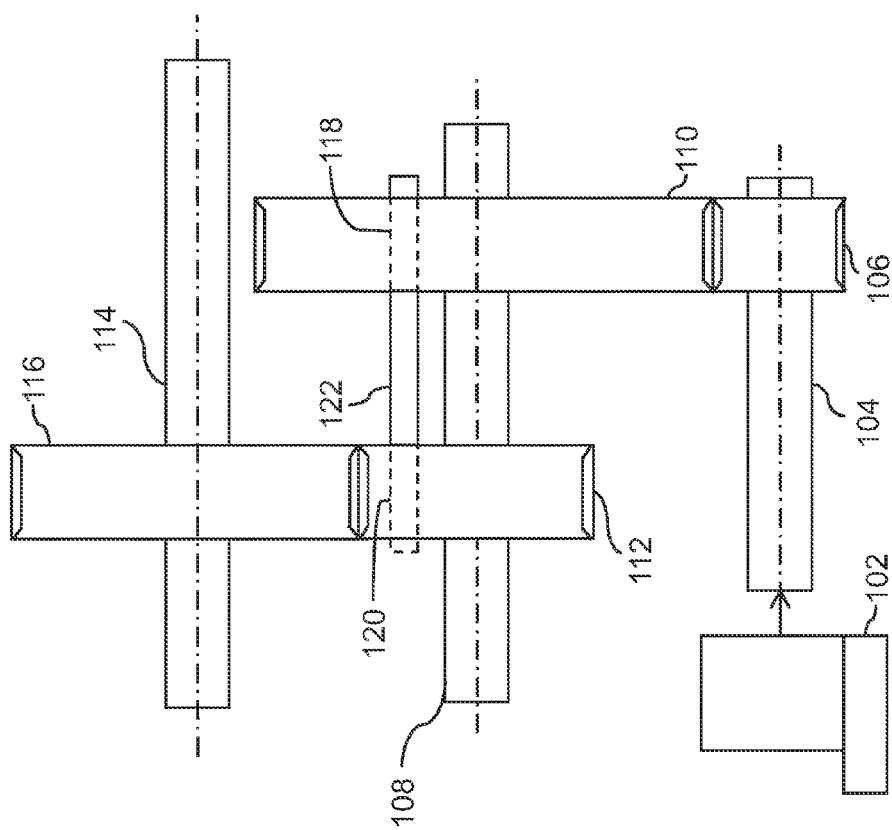

STEERING FUSE

TECHNICAL FIELD

The present disclosure generally relates to marine vessels. More, specifically, the present disclosure relates to torque transmission in a steering system for a marine pod drive.

BACKGROUND

Typically, vehicles and/or machines include a fuel-powered engine that may provide mechanical power to various transmission mechanisms. A transmission mechanism, such as a steering system, generally includes a driving member and a driven member. The driving member transfers the mechanical power from the fuel-powered engine to one or more loads, such as a steering load. An exemplary driving member may be a driving gear mounted to a driving shaft, and an exemplary driven member may be a driven gear in mesh with the driving gear and mounted to a driven shaft. The driving member may be continuously engaged with the driven member or selectively engaged with the driven member. The driving shaft may be rotated by the fuel-powered engine or an electric motor. Hence, rotation of the driving shaft may be transmitted to the driven shaft through the driving member and the driven member. In other words, the driving member transmits certain moment of force or torque to the driven member attached on the driven shaft. The driven shaft may be further connected to a load. For example, the driven shaft may be connected to a steering link of a vehicle. Hence, the driving shaft may transmit a torque to the driven shaft via the driving and the driven members.

Usually, the driving member and the driven member are designed to transmit the torque in a pre-specified range. In case the transmission mechanism experiences an excessive load, the driven member and/or the driving member may fail. In other words, gears of the driving member and the driven member may fracture when the load exceeds the tensile strength of the gear material. Load may also increase due to bearing seizure, any foreign material passing through the mesh of the gears, sudden failure of the engine, or misalignment of the gears. Also, if the torque transferred by the driven member and the driving member exceeds the pre-specified range, the complete transmission mechanism may fail.

One of the existing systems provides a keyway and key mechanism to prevent damage to gears in an event of excessive load. In such mechanisms a key is used to attach a rotating gear to a gear shaft. The key can be inserted in a key seat or keyway in the gear shaft. The keyway can be a grove or a pocket provided on the gear shaft such that the key can be fitted inside the keyway and the key can temporarily fasten the gear with the gear shaft. Hence, the keyway and key mechanism prevents any relative motion between the gear and gear shaft. Thus, in the condition of excessive load, the keyway or the key may shear. However in such a system, the gear and the gear shaft may need to be dis-assembled or replaced in an event of failure of the key or the keyway.

SUMMARY

The disclosure relates to a steering system for a marine pod drive. The system includes a driving shaft, and a driving pinion attached to the driving shaft. The system further includes a driven shaft, and a driven gear mounted to the driven shaft. Furthermore, the system includes an intermediate shaft. Additionally, the system includes an intermediate gear mounted to the intermediate shaft and in mesh with the driving gear. Also the system includes an intermediate pinion attached to the intermediate shaft and in mesh with the driven gear. Furthermore the system includes, a fuse pin configured to fasten the intermediate gear with the intermediate pinion. Moreover, the fuse pin is configured to shear when a transmitting torque in the system exceeds a rated torque value.

BRIEF DESCRIPTION OF THE DRAWINGS

FIG. 1 illustrates an exemplary steering system according to an embodiment of the present disclosure.

DETAILED DESCRIPTION

FIG. 1 illustrates an exemplary steering system 100 for a marine pod drive. The steering system 100 may be configured to transmit rotational motion from one shaft to another shaft. The steering system 100 is shown to include a drive motor 102, a driving shaft 104, a driving pinion 106, an intermediate shaft 108, an intermediate gear 110, an intermediate pinion 112, a driven shaft 114, and a driven gear 116.

The steering system 100 may be configured to transfer rotational motion from the drive motor 102 to the driven shaft 114, via the driving shaft 104, the driving pinion 106, the intermediate shaft 108, the intermediate gear 110, the intermediate pinion 112, and the driven gear 116. The drive motor 102 may be a power source for providing rotary motion to the driving shaft 104. For example, the drive motor 102 may be an engine, an electric motor, a hydraulic motor, a pneumatic motor, a crank shaft mechanism, and the like. The drive motor 102 can be configured to rotate the driving shaft 104. Further, the driving pinion 106 may be attached to the driving shaft 104 such that the driving pinion 106 rotates with the rotation of the driving shaft 104. In one embodiment, the driving pinion 106 can be mounted to the driving shaft 104 by a mounting mechanism known in the art. For example, the driving pinion 106 may be welded, have splines, internal gears, a key and keyway mechanism, a square hole, or at one least flat surface hole in the driving pinion 106 that mates with a similar design on the driving shaft 104. Thus, the rotation of the driving shaft 104 rotates the driving pinion 106. In an embodiment, the driving pinion 106 may be integral to the driving shaft 104. In an embodiment, as illustrated in FIG. 1, the driving pinion 106 may be casted or machined as a single unit with the driving shaft 104, thus can be an integral part of the driving shaft 104.

The rotary motion of the driving shaft 104 may be transmitted to the intermediate shaft 108. The intermediate shaft 108 can include the intermediate gear 110. The intermediate gear 110 can be mounted to the intermediate shaft 108 and in mesh with the driving pinion 106. In an embodiment, the intermediate shaft 108 can be positioned adjacent to the driving shaft 104 in a manner such that the intermediate gear 110 is in continuous mesh with the driving pinion 106. In other words, the rotary motion of the driving shaft 104 can be transmitted to the intermediate shaft 108 via the driving pinion 106 and the intermediate gear 110. The intermediate gear 110 can be mounted to the intermediate shaft 108 by a mounting mechanism known in the art. It may be noted that the intermediate gear 110 can be removeably mounted to the intermediate shaft 108 in a manner such that the intermediate gear 110 can either rotate freely on intermediate shaft or be fastened to rotate with the intermediate shaft 108. In other words, the intermediate gear 110 is removeably mounted to the intermediate shaft 108 such that the intermediate gear 110 can rotate freely or slip on the intermediate shaft 108. The intermediate gear 110 can rotate with the rotation of the driving shaft 104 via the driving pinion 106, whereas the intermediate shaft 108 can remain stationary. It can be contemplated that the intermediate gear 110 can rotate freely on the intermediate shaft 108, hence does not transfer any rotary motion unless fastened to rotate with the intermediate shaft 108.

Further, the intermediate shaft 108 includes the intermediate pinion 112. The intermediate pinion 112 can be attached to the intermediate shaft 108 such that intermediate pinion 112 can be co-axial with the intermediate gear 110. In an embodiment, the intermediate pinion 112 can be integral to the intermediate shaft 108. In other words, the intermediate pinion 112 may be casted or machined as a single unit with the intermediate shaft 108, thus can be an integral part of the intermediate shaft 108.

It may be noted that the intermediate pinion 112 can be casted as an integral part with on the intermediate shaft 108, and the intermediate gear 110 can be removeably mounted at a fixed axial distance from the intermediate pinion 112. The intermediate gear 110 can be mounted to either side of the intermediate pinion 112.

The steering system 100 also includes the driven shaft 114. In an embodiment, the driven shaft 114 can be disposed adjacent to the driving shaft 104 and the intermediate shaft 108. The driven shaft 114 includes the driven gear 116. The driven gear 116 may be in mesh with the intermediate pinion 112 and mounted to the driven shaft 114 by a mounting mechanism known in the art. For example, the driven gear 116 can be fastened on the driven shaft 114 by a nut and bolt mechanism, welded, have splines, internal gears, a key and key way mechanism, a square hole, or at one least flat surface centre hole in the driven gear 116, that mates with a similar design on the driven shaft 114. Hence, the driven gear 116 and the driven shaft 114 can rotate as complete unit. The driven gear 116 can be in mesh with the intermediate pinion 112. In an embodiment, the driven gear 116 can be a helical gear or a spur gear in mesh with the intermediate pinion 112.

In an embodiment, the driven shaft 114 can be a steering shaft for a steering mechanism of a marine pod drive. In other words, the drive motor 102 can be steering motor configured to rotate a steering shaft of a marine pod drive through the steering system 100.

FIG. 1 further illustrates a first hole 118 in the intermediate gear 110 and a second hole 120 in the intermediate pinion 112. In an embodiment, the first hole 118 and the second hole 120 can be drilled parallel to axis of intermediate shaft 108. A fuse pin 122 may be disposed inside the first hole 118 and the second hole 120 to fasten the intermediate gear 110 with the intermediate pinion 112. In other words, the intermediate gear 110 is fastened to rotate with the rotation of the intermediate shaft 108. The fuse pin 122 can be positioned in the first hole 118 and the second hole 120 in manner such that the intermediate pinion 112, the intermediate gear 110 and the intermediate shaft 108 rotate as an integral unit. In other words, the fuse pin 122 can be disposed in a manner to cause the rotation of the intermediate pinion 112 and the intermediate shaft 108 with the rotation of the intermediate gear 110. Thus, the intermediate gear 110 may be fastened and rotated with the intermediate pinion 112. Examples of the fuse pin 122 may include, but are not limited to, a metal pin, a wedge, a key, and the like. In an embodiment, the fuse pin 122 can be alloy steel or any other suitable material.

In operation, the drive motor 102 rotates the driving shaft 104. The rotation of the driving shaft 104 causes the rotation of the driving pinion 106. The driving pinion 106 is in mesh with the intermediate gear 110. The rotation of the intermediate gear 110 causes the rotation of the intermediate shaft 108, when the intermediate gear 110 is fastened with the intermediate pinion 112. In other words, the fuse pin 122 fastens the intermediate gear 110 with the intermediate pinion 112. Hence the rotation of the intermediate gear 110 causes the rotation of the intermediate pinion 112 and the intermediate shaft 108. The intermediate pinion 112, in turn is in mesh with the driven gear 116. The rotation of the driven gear 116 causes the rotation of the driven shaft 114. Hence, the steering system 100 may be designed for transmitting torque or rotary motion from the driving shaft 104 to the driven shaft 114 of the steering system 100 for the marine pod drive.

The driving shaft 104 may be rotated by the drive motor 102. The rotation of the driving shaft 104 may be transmitted to the driven shaft 114 through the driving pinion 106, the intermediate gear 110, the intermediate pinion 112 and the driven gear 116. In other words, the driving shaft 104 is said to have transmitting torque or certain moment of force to the driven shaft 114. The driving shaft 104 and the driven shaft 114 of the steering system 100 may be designed to transmit rotary motion or torque in a pre-specified range. In other words, the steering system 100 may have a rated torque. For example, the driving shaft 104 may be an output shaft from a power transmission and the driven shaft 114 can be an input shaft of a steering mechanism. The driving shaft 104 and the driven shaft 114 along with the intermediate shaft 108 may be configured to have a value of torque corresponding to a pre-specified range of torque that can be transmitted through them. In other words, torque that can be transmitted from the driving shaft 104 and the driven shaft 114 can be limited by the material, shape or design of the driving shaft 104, the driven shaft 114, and intermediate shaft 108. The amount of torque transmitted can also be limited by the material, design, size, and tooth profile of the driving pinion 106, intermediate gear 110, intermediate pinion 112 and the driven gear 116. Thus, the maximum value of torque that the steering system 100 is capable of transferring can be referred as the rated torque value.

In an embodiment, the driving shaft 104 and the driven shaft 114 may be transmitting torque which may exceed the rated torque value. For example, driving pinion 106 or the driven gear 116 may fracture when the load exceeds the tensile strength of the gear material. Load may also increase due to bearing seizure, any foreign material passing through the mesh of the gears, sudden failure of the engine, or misalignment of the gears. Another cause of failure could be a static or impact load, to the steerable housing that extends below the hull of the marine vessel, which would cause a rotational force on the steering system 100 would exceed the materials of the steering system 100. In other words, the steering system 100 may be subjected to an excessive torque beyond the rated torque value. As a result of the excessive torque, the fuse pin 122 connecting the intermediate gear 110 and the intermediate pinion 112 experiences a shearing load. The shearing load results in shearing of the fuse pin 122, thereby causing the intermediate gear 110 to dis-engage from the intermediate pinion 112 and rotate freely on the intermediate shaft 108. Thus, the fuse pin 122 shears when the transmitted torque through the steering system 100 exceeds the rated torque value. Hence, the intermediate gear 110 is unfastened and rotates freely on the intermediate shaft 108. Therefore, the rotary motion of the driving shaft 104 is not transmitted to the driven shaft 114. In other words, the fuse pin 122 acts a fuse for the steering mechanism 100 and dis-engages the intermediate gear 110 from the intermediate pinion 112, thereby preventing overloading and consequent damage to the steering system 100.

INDUSTRIAL APPLICABILITY

The present disclosure applies generally to marine vessels and specifically applicable to a steering system 100 of a marine pod drive. The steering system 100 may include a steering gear case, an input shaft, and an output shaft. The input shaft may be similar to the driving shaft 104. The output shaft may be similar to the driven shaft 114 and may be further connected to steering linkage of the marine pod drive. The input shaft may be driven by a pod drive unit similar to the drive motor 102. In other words, the input shaft may be a driving shaft 104 that may be rotated by the pod drive unit, such as the electronic power steering motor, a stepper motor, a hydraulic motor and the like. The input shaft and the output shaft are connected by a steering gear case. The steering gear case may include a set of gears mounted to a common shaft similar to the intermediate gear 110, the intermediate pinion 112, and the intermediate shaft 108. In an embodiment, the input shaft, the steering gear case and the output shaft may be similar to the steering system 100, as illustrated in FIG. 1. Hence, torque may be transmitted through the input shaft to the output shaft through the steering gear case.

The output shaft may be further connected to a steering link of a propulsion unit. In general, the propulsion unit may be rotatably mounted with a hull of the marine vessel. The propulsion unit may include at least one propeller that may be rotated to produce forward or backward thrust. Further, the propulsion unit may be steered about a suitable axis, to steer the vessel. The propulsion unit can be steered by the steering link.

Hence, the output shaft steers the propulsion unit through the steering link. In other words, the rotary motion of the input shaft may be transmitted to the output shaft which in turn may be attached to steering link of the propulsion unit of the marine vessel. Hence, the rotation of the input shaft (analogous to the driving shaft 104) causes the rotation of the output shaft (analogous to the driven shaft 114), through the steering gear case, thereby rotating the propulsion unit.

Maneuvering the propulsion unit of the vessel requires torque to be transmitted from the input shaft to the output shaft. During such maneuvering, the transmitting torque may exceed the rated torque value. For example, while steering the vessel, wooded logs may get stuck around the propulsion unit. Operator of the vessel may try to steer the propulsion unit and in the event apply additional power through the pod drive unit. In such as scenario, the steering gear case may be subjected to torque which may exceed the rated torque value. Hence, the driving pinion and the driven gear may break or damage. Also, the pod drive unit may get over loaded and fail. However, the disclosed steering system 100 provides the fuse pin 122. Instead, failure of gears or the pod drive unit, the fuse pin 122 shears and disengages the input shaft from the output shaft. Thus, the excess load can be prevented from being transmitted through the steering system 100. Hence, the fuse pin 122 protects the steering system 100 of a marine pod drive from damage. Also, in an event of excessive load, the sheared fuse pin 122 may be replaced easily without having to disassemble the propulsion unit or the input or output shaft of a marine pod.

It should be understood that the above description is intended for illustrative purposes only and is not intended to limit the scope of the present disclosure in any way. Thus, those skilled in the art will appreciate that other aspects of the disclosure can be obtained from a study of the drawings, the disclosure, and the appended claim.

What is claimed is:
1. A steering system for a marine pod drive, comprising:
a driving shaft;
a driving pinion attached to the driving shaft;
a driven shaft;
a driven gear mounted to the driven shaft;
an intermediate shaft;
an intermediate gear mounted to the intermediate shaft and in mesh with the driving pinion;
an intermediate pinion, attached to the intermediate shaft and in mesh with the driven gear; and
a fuse pin configured to fasten the intermediate gear with the intermediate pinion, wherein the fuse pin is configured to shear when a transmitting torque exceeds a rated torque value.

* * * * *